United States Patent
Ma et al.

(10) Patent No.: US 10,120,208 B2
(45) Date of Patent: Nov. 6, 2018

(54) OPTICAL FILM, BACKLIGHT MODULE AND LIQUID CRYSTAL DISPLAY DEVICE

(71) Applicant: BOE TECHNOLOGY GROUP CO., LTD., Beijing (CN)

(72) Inventors: Yongda Ma, Beijing (CN); Yongchun Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/769,093

(22) PCT Filed: Mar. 13, 2015

(86) PCT No.: PCT/CN2015/074215
§ 371 (c)(1),
(2) Date: Aug. 18, 2016

(87) PCT Pub. No.: WO2016/065791
PCT Pub. Date: May 6, 2016

(65) Prior Publication Data
US 2017/0227794 A1 Aug. 10, 2017

(30) Foreign Application Priority Data
Oct. 29, 2014 (CN) ..................... 2014 2 0634475 U

(51) Int. Cl.
*F21V 7/04* (2006.01)
*G02F 1/00* (2006.01)
*G02F 1/13357* (2006.01)
*G02F 1/1335* (2006.01)

(52) U.S. Cl.
CPC ............ *G02F 1/009* (2013.01); *G02F 1/1335* (2013.01); *G02F 1/1336* (2013.01); *G02F 2001/133628* (2013.01)

(58) Field of Classification Search
CPC ...................................................... G02F 1/009
See application file for complete search history.

(56) References Cited

U.S. PATENT DOCUMENTS

| 2012/0087122 A1* | 4/2012 | Takeuchi .......... G02F 1/133603 362/235 |
| 2013/0002979 A1* | 1/2013 | Nakamura ........... G02B 6/0055 349/58 |

FOREIGN PATENT DOCUMENTS

| CN | 201764409 | 3/2011 |
| CN | 102043285 | 5/2011 |
| CN | 203298106 | 11/2013 |

(Continued)

OTHER PUBLICATIONS

English Translation of WANG, CN 201764409U, Mar. 16, 2011.*
(Continued)

*Primary Examiner* — Evan Dzierzynski
(74) *Attorney, Agent, or Firm* — Womble Bond Dickinson (US) LLP

(57) ABSTRACT

The present disclosure discloses an optical film, a backlight module and a liquid crystal display device and relates to the liquid crystal display field. It solves the problem that the edge of an optical film in the prior art can be easily warped. An optical film is provided and comprises an optical film body, and at a position of the optical film body that is close to a heat source, a thermal expansion stretchable structure is provided and is capable of releasing a thermal expansion amount of the optical film body.

7 Claims, 2 Drawing Sheets

(56) References Cited

FOREIGN PATENT DOCUMENTS

| | | |
|---|---|---|
| CN | 103672724 | 3/2014 |
| CN | 204129383 | 1/2015 |

OTHER PUBLICATIONS

International Search Report and Written Opinion with English Language Translation, dated Jun. 26, 2015, Application No. PCT/CN2015/074215.

* cited by examiner

OPTICAL FILM, BACKLIGHT MODULE AND LIQUID CRYSTAL DISPLAY DEVICE

RELATED APPLICATIONS

The present application is the U.S. national phase entry of PCT/CN2015/074215, with an international filing date of Mar. 13, 2015, which claims the benefit of Chinese Patent Application No.201420634475.1, filed on Oct. 29, 2014, the entire disclosures of which are incorporated herein by reference.

FIELD

The present disclosure relates to the technical field of liquid crystal displays and, in particular, to an optical film, a backlight module and a liquid crystal display device.

BACKGROUND

As a liquid crystal display and a television set grow constantly in size, the size of an optical film applied in a liquid crystal backlight module increases as well. The optical film will expand because of heating at an edge close to the heat source. Since an optical film is less thermally conductive, the optical film will be warped at the edge close to the heat source due to inhomogeneous heating thereto. When the edge of the optical film is warped from local expansion under heating, there will be side incidence light to enter into the optical film from one side thereof, resulting in the formation of dark shadows in wave shape at the entrance side of the optical film for the side incidence light, and thus in a poor display effect of the liquid crystal display module.

Therefore, in order to improve the display effect of the liquid crystal display model, it is necessary to control the warps at an edge of the optical film due to expansion under heating.

SUMMARY

It is an embodiment of the present disclosure to provide an optical film, a backlight module and a liquid crystal display device, in order to solve the problem that the edge of an optical film in the prior art can be easily warped.

According to a first aspect of the present disclosure, an optical film is provided, which may comprise an optical film body, and at a position of the optical film body that is close to a heat source, a thermal expansion stretchable structure is provided and is capable of releasing a thermal expansion amount of the optical film body.

In one embodiment of the present disclosure, the thermal expansion stretchable structure may comprise a through hole arranged in the optical film body, which has a polygonal profile.

In another embodiment of the present disclosure, the thermal expansion stretchable structure may be a notch arranged in the optical film body.

In a further embodiment of the present disclosure, the through hole may be in a regular or irregular shape.

Therein, the through hole may be in an inverted trapezoidal, a rectangular or a circular shape.

Therein, the notch may comprise one or more slots.

Therein, one or more slots are multiple slots.

In another embodiment of the present disclosure, the thermal expansion stretchable structure may further comprise a thermally conductive depression bar press fitted on the thermal expansion stretchable structure.

According to a second aspect of the present disclosure, a backlight module is provided, and the backlight module comprises the above-said optical film.

According to a third aspect of the present disclosure, a liquid crystal display device is provided, and the liquid crystal display device comprises the above-said optical film.

In one embodiment of the present disclosure, the thermal expansion stretchable structure may extend into a visible area of the liquid crystal display device.

In the optical film, the backlight module and the liquid crystal display device provided by the embodiments of the present disclosure, the optical film comprises an optical film body; a thermal expansion stretchable structure is provided at a position of the optical film body that is close to a heat source; the thermal expansion stretchable structure is capable of releasing a thermal expansion amount of the optical film body, such that the thermal expansion amount of the optical film body is released, whereby the edge of the optical film at a position close to the heat source receives a better flatness thus avoiding warps that may occur to the edge of the optical film.

DETAILED DESCRIPTION

The embodiments of the present disclosure are described below in detail in conjunction with the accompanying drawings.

In an embodiment of the present disclosure, an optical film is provided and comprises an optical film body, and at a position of the optical film body that is close to a heat source, a thermal expansion stretchable structure is provided and is capable of releasing a thermal expansion amount of the optical film body, such that the thermal expansion amount of the optical film body is released, whereby the edge of the optical film at a position close to the heat source receives a better flatness thus avoiding warps that may occur to the edge of the optical film.

Figure 1:
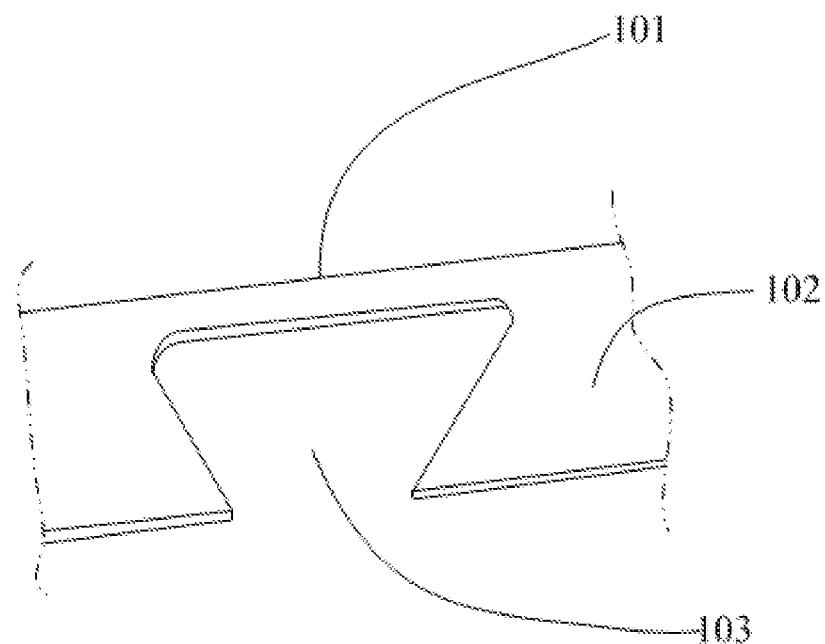
FIG. 1 is a schematic diagram of the structure of an optical film provided by an embodiment of the present disclosure.

Referring to FIG. 1, in the above embodiment, the thermal expansion stretchable structure may be a notch 103 arranged in the optical film body 102. The notch 103 is capable of releasing a thermal expansion amount of the optical film close to the heat source, such that the optical film can be maintained with a better flatness. The shape of the notch 103 can be trapezoidal, rectangular or others. Therein, the notch 103 may extend to a visible area 101.

Figure 2:
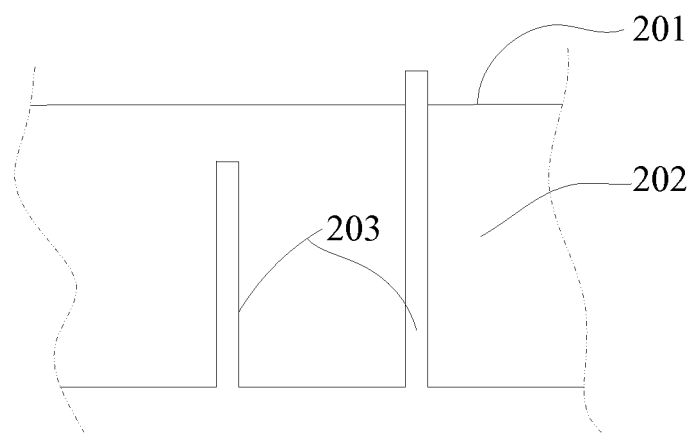
FIG. 2 is a schematic diagram of the structure of another optical film provided by an embodiment of the present disclosure.

Referring to FIG. 2, in the above embodiment, the notch 103 may comprise slots 203, the width of which can be set according to practical circumstances. The slots 203 may have a length that extends to a visible area 201, so that the slots 203 can better release the thermal expansion amount of the optical film body 202. Since the viewing distance of a larger sized liquid crystal display or television set is larger, the part of the slots 203 that extends to the visible area 201 would not cause serious impact on the display image.

In order to enhance the thermal expansion amount releasing effect of the slot, there may be provided a plurality of the slots 203.

Figure 3:
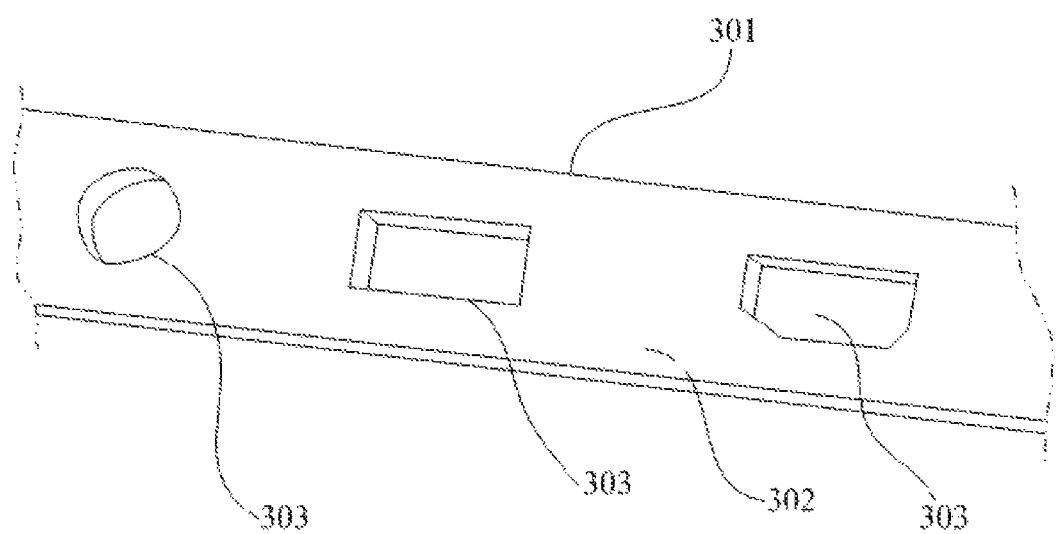
FIG. 3 is a schematic diagram of the structure of a further optical film provided by an embodiment of the present disclosure.

Referring to FIG. 3, in the above embodiment, the thermal expansion stretchable structure may be a through hole 303 arranged in the optical film body 302. When the optical film body 302 gets close to the heat source, the through hole 303 thereon can accelerate the releasing for the thermal expansion of the optical film body 302, so as to realize as soon as possible the release of the optical film thermal expansion amount and thereby avoid warps that may occur to the edge of the optical film. Specifically, the through hole 303 may be an inverted trapezoidal or a rectangular shape. Of course, the shape of the through hole 303 is not limited to the inverted trapezoid or rectangle, and it may have other shapes as well, such as a circular shape. The through hole 303 may be in a regular or irregular shape. For example, the through hole 303 may be a polygon.

It should be clear that the thermal expansion stretchable structure may further comprise a thermally conductive depression bar press fitted on the thermal expansion stretchable structure. The thermally conductive depression bar is capable of absorbing and releasing the thermal expansion amount of the optical film body. Moreover, the thermally conductive depression bar can play a function of tightening the edge of the optical film that is close to the heat source, to thus avoid deformations or warps that may occur to the edge of the optical film due to thermal expansion.

In an embodiment of the present disclosure, a backlight module is also provided and comprises the above optical film. The optical film comprises an optical film body, and at a position of the optical film body that is close to a heat source, a thermal expansion stretchable structure is provided and is capable of releasing a thermal expansion amount of the optical film body, such that the thermal expansion amount of the optical film body is released, whereby the edge of the optical film at a position close to the heat source receives a better flatness thus avoiding warps that may occur to the edge of the optical film.

In an embodiment of the present disclosure, a liquid crystal display device is also provided and comprises the above optical film. The optical film comprises an optical film body, and at a position of the optical film body that is close to a heat source, a thermal expansion stretchable structure is provided and is capable of releasing a thermal expansion amount of the optical film body, such that the thermal expansion amount of the optical film body is released, whereby the edge of the optical film at a position close to the heat source receives a better flatness thus avoiding warps that may occur to the edge of the optical film.

In this description, the specific features, structures, materials or characteristics can be combined in any appropriate manner(s) in any one or more embodiments or examples.

The above are the specific embodiments of the present disclosure, but the scope of the present disclosure is not limited thereto. Various of variations or replacements within the technical scope revealed by the present disclosure easily occur to any skilled persons in the art, and this should also be included in the scope of the present disclosure. Therefore, the scope of the present disclosure should be according to the scope of the claims.

The invention claimed is:

1. A liquid crystal display device, wherein the liquid crystal display device comprises a optical film, the optical film comprising an optical film body,
   wherein at a position of the optical film body that is close to a heat source, a thermal expansion stretchable structure is provided and is capable of releasing a thermal expansion amount of the optical film body, and
   wherein the thermal expansion stretchable structure comprises a plurality of slots with different lengths, and at least one of the plurality of slots extends into a visible area of the liquid crystal display device.

2. The liquid crystal display device according to claim 1, wherein the heat expansion stretchable structure comprises a through hole arranged in the optical film body.

3. The liquid crystal display device according to claim 2 wherein the through hole is in a regular or irregular shape.

4. The liquid crystal display device according to claim 3, wherein the through hole is in an inverted trapezoidal, a rectangular or a circular shape.

5. The liquid crystal display device according to claim 2, wherein the through hole is in an inverted trapezoidal, a rectangular or a circular shape.

6. The liquid crystal display device according to claim 1, wherein the heat expansion stretchable structure comprises a notch arranged in the optical film body.

7. The liquid crystal display device according to claim 6, wherein the notch comprises one or more slots.

* * * * *